United States Patent [19]

Cox

[11] 4,162,078

[45] Jul. 24, 1979

[54] INJECTABLE PACKING FORMULATION CONTAINING FLEXIBLE GRAPHITE

[75] Inventor: Carl V. Cox, Middleburgh Heights, Ohio

[73] Assignee: Union Carbide Corporation, New York, N.Y.

[21] Appl. No.: 874,323

[22] Filed: Feb. 1, 1978

[51] Int. Cl.$^2$ .................. B65D 53/00; E21B 33/00; C10M 5/00; C10M 7/00

[52] U.S. Cl. ................................. 277/102; 252/13; 277/DIG. 6

[58] Field of Search ................... 252/13, 14; 277/102

[56] References Cited

U.S. PATENT DOCUMENTS

| | | | |
|---|---|---|---|
| 3,271,308 | 9/1966 | Veit et al. | 252/13 |
| 3,404,061 | 10/1968 | Shane et al. | 161/125 |
| 4,068,853 | 1/1978 | Schnitzler | 161/125 |

OTHER PUBLICATIONS

Bulletin TP2-175A, "Thermal Pak TP2 Expansion Joints", Advanced Thermal Systems, Aug. 1977, pp. 1-12.

"Steam Cycle Test Report (TPC-1)", Advanced Thermal Systems, 1977, pp. 1-3.

*Primary Examiner*—Delbert E. Gantz
*Assistant Examiner*—Irving Vaughn
*Attorney, Agent, or Firm*—John S. Piscitello

[57] ABSTRACT

An injectable packing formulation comprising particulate flexible graphite and a suitable liquid lubricant. Such formulation can be used to pack the stuffing box assembly of any pump, valve, expansion joint, or like structure, and is particularly useful at temperatures in excess of 500° F. where other packing materials do not perform satisfactorily. While stuffing boxes filled with conventional injectable packing formulations require frequent re-packing in order to maintain a seal when operated at elevated temperatures, stuffing boxes packed with the packing formulation of the present invention require little or no maintenance even when operated at highly elevated temperatures.

42 Claims, No Drawings

INJECTABLE PACKING FORMULATION CONTAINING FLEXIBLE GRAPHITE

BACKGROUND OF THE INVENTION

This invention relates to an injectable packing formulation for packing a stuffing box assembly, and to the seals formed thereby. More particularly, this invention relates to an injectable packing formulation for packing the stuffing box assembly of pumps, valves, expansion joints, and like structures, comprising particles of flexible graphite and a suitable lubricant.

Known injectable packing formulations are usually composed of an oil and a filler material, such as asbestos and/or polytetrafluoroethylene. The oil present in such formulations serves two primary purposes. The first is to facilitate injection of the packing into the stuffing box assembly of a pump, valve or expansion joint by reducing the resistance to flow of the solid filler material. The second is to serve as the agent through which pressure is maintained in the stuffing box. Thus, because such liquid is essentially non-compressible, it readily transmits the pressure applied to it and thereby acts to maintain an effective seal. As such it forms an integral part of the seal and the performance of the packing rests first and foremost upon this liquid agent.

Unfortunately, many oils and other liquids employed in injectable packing formulations begin to chemically decompose and/or leak from the stuffing box in which they are employed at temperatures as low as 200° F. At higher temperatures, e.g., from 400° F. to 500° F., the decomposition may yield residual deposits that are hard and abrasive, and damage to the stem or slide of the stuffing box may result from movement of these parts against these deposits. More importantly, however, any fluid loss sustained as a result of such leakage, or any void space created by the decomposition, causes a drop in internal pressure within the stuffing box. As a result, the seal fails and additional packing must be added to the system.

Another source of failure of seals packed with conventional injectable packing formulations is the plastic, putty-like nature of these materials. This results in the sealing off of air pockets within the mass of such formulations and the introduction of these pockets into the stuffing box along with the packing. Inevitably, the air escapes from the packing, the packing collapses into the void created, and the seal fails.

Still another source of failure of seals packed with conventional injectable packing formulations lies with the fillers employed in such formulations. Thus, certain conventional fillers, such as asbestos, are highly abrasive and require large quantities of lubricant to be injected into a stuffing box. However, as noted above, seal performance is adversely affected by the loss of pressure which occurs as a result of the decomposition and leakage of fluid which occurs at elevated temperatures. In addition, at temperatures of 450° F. and above, asbestos itself undergoes chemical changes that causes it to shrink and harden. Not only does seal performance suffer by the void space created by this shrinkage, but the resulting hardening of the packing makes the addition of make-up packing more difficult.

Other fillers, such as polytetrafluoroethylene, undergo cold flow even at temperatures as low as room temperature. As a result, attempts to apply pressure to formulations containing such materials often results in forcing the packing back into the injection mechanism and/or through tolerance spaces between part interfaces. Furthermore, at temperatures of 450° F. or more, polytetrafluoroethylene becomes highly plastic and decomposes leaving substantial voids. Not only is pressure within the stuffing box adversely affected by the voids created by the decomposition, but the plastic polytetrafluoroethylene begins to flow from the stuffing box along with the lubricant at such temperatures causing an even greater drop in pressure and seal performance.

SUMMARY OF THE INVENTION

The present invention provides an injectable packing formulation comprising particulate flexible graphite and a suitable lubricant which can be used to pack the stuffing box assembly of any pump, valve, expansion joint, or like structure. Such packing material is particularly useful at temperatures in excess of 500° F. where other packing materials do not perform satisfactorily. Conventional packing formulations, as suggested above, are generally limited to use at temperatures below 400° F. to 500° F., and hence are not suitable for use in steam expansion joints and other high temperature applications.

DESCRIPTION OF THE PREFERRED EMBODIMENTS

While the injectable packing formulation of the present invention does exhibit some improvement in sealing capacity compared to injectable packing formulations heretofore employed when such formulation is employed in stuffing boxes operated at room temperature, it exhibits much greater superiority over such previously employed formulations at temperatures of about 200° F. and above, and such superiority becomes more pronounced as the operating temperature increases. Thus, while stuffing boxes filled with previous injectable packing formulations require frequent re-packing in order to maintain a seal when operated at elevated temperatures, stuffing boxes packed with the packing formulation of the present invention require little or no maintenance even when operated at highly elevated temperatures. Thus, the packing formulation of the present invention has been used to pack stuffing boxes which have been operated maintenance free for extended periods of time at temperatures of 850° F. and higher. The reduced maintenance and higher operating temperature capacity of seals produced with the packing formulations of the present invention provides this material with a clear advantage over previous injectable packings. In addition, as a result of the reduced maintenance requirements, the system can be employed in remote or inaccessible locations. Furthermore, inasmuch as the packing of the present invention is highly permeable and does not possess the putty-like consistency of conventional packing formulations, any air present in the system readily escapes when it is initially compressed in the stuffing box and is not retained in the stuffing box.

The superior sealing ability of the injectable packing of the present invention over previous injectable packings is attributable to the peculiar nature of the flexible graphite used as the filler material which enables stuffing boxes packed with such packing to maintain a residual internal pressure even after complete separation of the liquid lubricant from the filler. Specifically, because this material is both resilient and cohesive, it forms a solid packing when compressed in the stuffing box which maintains its volume even after loss of lubricant. As a result, the packing does not collapse when the lubricant is driven off, and a residual internal pressure is maintained which acts to maintain an effective seal. The resiliency of this material has been shown to be stable under both thermal and mechanical stress. Thus, this material remains stable at temperatures up to 1500° F. and higher under conditions customarily found in a stuffing box, and does not undergo the shrinkage and hardening which is characteristic of other fillers. In addition, because of the relatively low coefficient of friction of this material and its peculiar planar structure, it acts as a solid lubricant which enables it to be more easily injected into the stuffing box.

Inasmuch as the packing formulation of the present invention can still maintain an effective seal even after the liquid lubricant has been driven off, it is apparent that such lubricant does not act as an integral part of the seal as it does in conventional injectable packings. On the contrary, as can be seen from the preceding discussion, in the injectable packing formulation of the present invention it is the built-in resiliency of the flexible graphite itself which is responsible for the seal performance of the packing.

Any suitable liquid lubricant can be employed in the injectable packing formulation of the present invention. Preferably, the lubricant employed should leave little or no residual deposits when volatilized. Examples of commercially available lubricants which can be employed include Mobil-1 synthetic oil and Dow Corning silicone 200 fluid. Such lubricant should be employed in an amount of from about 5 percent by weight to about 35 percent by weight, preferably from about 15 percent by weight to about 30 percent by weight, of the total weight of flexible graphite and lubricant employed. A lubricant content below 5 weight percent is impractical as extremely high pressures are required to inject a formulation containing such small amount of lubricant into a stuffing box. Above 35 weight percent, the flexible graphite present in the formulation becomes essentially completely saturated with the lubricant. As a result, densification and cohesion of the flexible graphite will not occur upon application of pressure in the stuffing box, and effective seal pressure will not be maintained when the liquid is driven off from the system.

If desired, solid lubricants and/or other additives may be added to the packing formulation. Among such solid lubricants are graphite powder, molybdenum disulfide, boron nitride, calcium oxide, stannous oxide, lead monoxide, lead tetraoxide, and zirconium oxide.

The flexible graphite particles employed in the present invention can vary in length up to about 0.250 inch. Although particles small enough to pass through a No. 30 U.S. Standard sieve (0.0234 inch opening) can be employed, such particles are less desirable than somewhat larger particles because they are prone to back extrude into the injection mechanism or slip-extrude past part interfaces of the stuffing box (part interface tolerances in excess of 0.005 inch are not uncommon). For this reason, it is generally preferred to employ particles large enough to be retained on a No. 30 U.S. Standard sieve. In applications where part tolerances are less than 0.005 inch, however, smaller particles can be employed, provided they are large enough to be retained on a No. 50 U.S. Standard sieve (0.0117 inch opening).

The flexible graphite particles employed in the present invention can be prepared by shredding flexible graphite sheet. Such sheet can be prepared, as is well known, by expanding graphite flakes by a factor of at least 80 times in the "c" crystallographic axis direction, and then compressing the expanded flakes to form a cohesive structure. The expansion of graphite flakes can readily be achieved by attacking the bonding forces between layer planes in the internal structure of the graphite. The result of such an attack is that the spacing between the superposed layers can be increased so as to effect a marked expansion in the direction perpendicular to the layers which is the "c" axis direction. The expanded particles can be formed under a slight pressure into a foam material since the particles have the ability to adhere without a binder due to the large expansion. Tapes, sheets and the like are formed from the expanded particles by simply increasing the compressive pressure, the density of the formed graphite being related to the applied formation pressure. Densities of less than 5 pounds per cubic foot to about 137 pounds per cubic foot are readily obtained for this material. A full description of the method of making flexible graphite can be found in U.S. Pat. No. 3,404,061, issued on Oct. 1, 1968.

The flexible graphite sheet employed to produce the flexible graphite particles employed in the present invention preferably has a density of from about 10 lbs./ft.$^3$ to about 100 lbs./ft.$^3$, most preferably from about 50 lbs./ft.$^3$ to about 90 lbs./ft.$^3$, and a thickness of from about 0.003 inch to about 0.060 inch, preferably from about 0.005 inch to about 0.025 inch. If desired, the flexible graphite particles may be obtained by shredding material produced by expanding graphite flakes and compressing the expanded flakes into shapes having greater thicknesses than is chacteristic of sheet, e.g., blocks and the like.

The packing formulation of the present invention can be inserted into the stuffing box of any pump, valve, expansion joint, or the like, in a conventional manner by injecting it through a hole in the stuffing box using conventional hydraulic equipment. The pressure necessary to inject the packing formulation into the stuffing box depends upon the injection mechanism itself as well as upon the amount of liquid lubricant present in the formulation and the desired pressure in the stuffing box. The pressure desired in the stuffing box depends, of course, upon the particular application parameters.

When a formulation consisting of 70 weight percent flexible graphite and 30 weight percent lubricant is injected into a stuffing box so as to produce an initial pressure of at least 300 psi. therein, it has been found that a residual pressure of about 300 psi. will be maintained in the stuffing box even after complete loss of the liquid lubricant from the packing formulation during high temperature use (because of the resilient nature of the flexible graphite employed). Higher initial pressures, however, do not result in higher residual pressures. Formulations consisting of 80 weight percent flexible graphite and 20 weight percent lubricant provide a residual pressure of at least 1000 psi. after loss of lubricant, and formulations consisting of 85 weight percent flexible graphite and 15 weight percent lubricant provide a residual pressure of at least 1875 psi. after loss of lubricant. Generally, make-up packing is not required to maintain this residual pressure. If make-up packing is required for such reasons as faulty equipment or faulty installation, it usually need be added but once, generally at a time soon after the initial on-stream start-up of the expansion joint or other stuffing box in which it is installed.

The following examples are set forth for purposes of illustration so that those skilled in the art may better understand the invention. It should be understood that they are exemplary only, and should not be construed as limiting the invention in any manner.

EXAMPLE I

A sheet of "Grafoil"* grade GTB flexible graphite of 0.015 inch nominal thickness and 70 lbs./ft.$^3$ nominal density was shredded by means of a rotary shredder until it was capable of passing through a 0.25 inch screen. The shredded flexible graphite particles were then further reduced in size by means of a crosscut shredder, and then screened through a No. 10 U.S. Standard sieve (0.0787 inch opening) followed by a No. 30 U.S. Standard sieve (0.0234 inch opening). The particles which collected on the No. 30 sieve were generally sliver-shaped, having lengths up to ⅛ inch and widths of about 1/32 inch. The edges of these particles were often curled and, when flattened, the flattened pieces had widths of about 1/16 inch to 3/32 inch.

*"Grafoil" is a registered trademark of Union Carbide Corp.

Seventy (70) parts by weight of the shredded flexible graphite particles were then blended with thirty (30) parts by weight of Mobil-1 synthetic oil by means of a paddle mixer. Blending was continued for about 30 minutes to obtain a uniform dispersion of the particles and oil. The mixture of particles and oil was then injected into one expansion joint of an 8 inch double expansion joint. The opposite expansion joint was injected with an injectable packing formulation consisting of polytetrafluoroethylene, asbestos and oil. Injection was effected in each instance by compressing the packing formulation by means of conventional hydraulic equipment.

To compare the performance of the two injectable packings, steam was passed through the system while the pipe ends connected by the joint were slid back and forth by mechanical means over a distance of 5 inches at a rate of 2-5 cycles per minute. An equal distance was maintained between the pipe ends at all times in order to maintain a pressure balance within the system. The steam had a pressure of 125 psig. to 148 psig. and a temperature of 350° F. to 360° F.

The expansion joint packed with the packing formulation containing flexible graphite sustained 24,446 cycles without any leakage. After 19,419 cycles, the joint was disassembled to examine the packing. As a result, some packing expanded, crumbled, and fell out of the stuffing box. Surprisingly, in spite of this loss, no leakage was observed after reassembly of the joint and continued cycling.

The opposite expansion joint packed with the packing formulation containing polytetrafluoroethylene and asbestos, on the other hand, leaked on three occasions during the test. On each occasion it was necessary to inject additional packing to restore leak-tight conditions. The additional packing was added in the form of packing plugs by means of an adjustment fixture. On these occasions, a total of 32 plugs were added. Each plug was nominally ⅛ inch in length and ⅜ inch in diameter and had a volume of 0.268 cubic inches. The total volume added was 8.58 cubic inches. Inasmuch as the estimated volume of the expansion joint was 33 cubic inches, it is apparent that 26 percent by volume of make-up packing had to be added to compensate for loss of lubricant after exposure to 350° F.

EXAMPLE II

A sheet of "Grafoil" grade GTB flexible graphite of 0.015 inch nominal thickness and 70 lbs./ft.$^3$ nominal density was shredded by means of a rotary shredder until it was capable of passing through a 0.25 inch screen. The shredded flexible graphite particles were then further reduced in size by means of a crosscut shredder, and then screened through a No. 10 U.S. Standard sieve (0.0787 inch opening) followed by a No. 30 U.S. Standard sieve (0.0234 inch opening). The particles which collected on the No. 30 sieve were generally sliver-shaped, having lengths up to ⅛ inch and widths of about 1/32 inch. The edges of these particles were often curled and, when flattened, the flattened pieces had widths of about 1/16 inch to 3/32 inch.

Seventy (70) parts by weight of the shredded flexible graphite particles were then blended with thirty (30) parts by weight of Mobil-1 synthetic oil by means of a paddle mixer. Blending was continued for about 30 minutes to obtain a uniform dispersion of the particles and oil. The mixture of particles and oil was then injected into a valve stuffing box by compressing it by means of conventional hydraulic equipment. Sufficient pressure was applied to produce a pressure of in excess of 1000 psi. in the stuffing box. The 7/16 inch packing adjust screw of the stuffing box was then set to a torque of 50 inch pounds. The packing was found to be leakproof up to 1500 psi. water pressure at room temperature.

The valve was then disconnected from the test line and placed in an oven and heated at a temperature of 850° F. for 15 hours. When the valve was reconnected to the test line, it remained leak-proof at 300 psi. water pressure.

What is claimed is:

1. An injectable packing formulation comprising particulate flexible graphite and a liquid lubricant.

2. An injectable packing formulation as in claim 1 wherein the liquid lubricant is present in an amount of from 5 percent by weight to 35 percent by weight of the total weight of flexible graphite and lubricant present.

3. An injectable packing formulation as in claim 1 wherein the liquid lubricant is present in an amount of from 15 percent by weight to 30 percent by weight of the total weight of flexible graphite and lubricant present.

4. An injectable packing formulation as in claim 1 wherein the flexible graphite particles present are of a size sufficient to be retained on a No. 50 U.S. Standard sieve but do not exceed 0.250 inch in length.

5. An injectable packing formulation as in claim 4 wherein the liquid lubricant is present in an amount of from 5 percent by weight to 35 percent by weight of the total weight of flexible graphite and lubricant present.

6. An injectable packing formulation as in claim 4 wherein the liquid lubricant is present in an amount of from 15 percent by weight to 30 percent by weight of the total weight of flexible graphite and lubricant present.

7. An injectable packing formulation as in claim 1 wherein the flexible graphite particles present are of a size sufficient to be retained on a No. 30 U.S. Standard sieve but do not exceed 0.250 inch in length.

8. An injectable packing formulation as in claim 7 wherein the liquid lubricant is present in an amount of from 5 percent by weight to 35 percent by weight of the total weight of flexible graphite and lubricant present.

9. An injectable packing formulation as in claim 7 wherein the liquid lubricant is present in an amount of from 15 percent by weight to 30 percent by weight of the total weight of flexible graphite and lubricant present.

10. An injectable packing formulation as in claim 4 wherein the flexible graphite particles are produced from sheet having a density of from 10 lbs./ft.$^3$ to 100 lbs./ft.$^3$ and a thickness of from 0.003 inch to 0.060 inch.

11. An injectable packing formulation as in claim 10 wherein the liquid lubricant is present in an amount of from 5 percent by weight to 35 percent by weight of the total weight of flexible graphite and lubricant present.

12. An injectable packing formulation as in claim 10 wherein the liquid lubricant is present in an amount of from 15 percent by weight to 30 percent by weight of the total weight of flexible graphite and lubricant present.

13. An injectable packing formulation as in claim 4 wherein the flexible graphite particles are produced from sheet having a density of from 50 lbs./ft.$^3$ to 90 lbs./ft.$^3$ and a thickness of from 0.005 inch to 0.025 inch.

14. An injectable packing formulation as in claim 13 wherein the liquid lubricant is present in an amount of from 5 percent by weight to 35 percent by weight of the total weight of flexible graphite and lubricant present.

15. An injectable packing formulation as in claim 13 wherein the liquid lubricant is present in an amount of from 15 percent by weight to 30 percent by weight of the total weight of flexible graphite and lubricant present.

16. An injectable packing formulation as in claim 7 wherein the flexible graphite particles are produced from sheet having a density of from 10 lbs./ft.$^3$ to 100 lbs./ft.$^3$ and a thickness of from 0.003 inch to 0.060 inch.

17. An injectable packing formulation as in claim 16 wherein the liquid lubricant is present in an amount of from 5 percent by weight to 35 percent by weight of the total weight of flexible graphite and lubricant present.

18. An injectable packing formulation as in claim 16 wherein the liquid lubricant is present in an amount of from 15 percent by weight to 30 percent by weight of the total weight of flexible graphite and lubricant present.

19. An injectable packing formulation as in claim 7 wherein the flexible graphite particles are produced from sheet having a density of from 50 lbs./ft.$^3$ to 90 lbs./ft.$^3$ and a thickness of from 0.005 inch to 0.025 inch.

20. An injectable packing formulation as in claim 19 wherein the liquid lubricant is present in an amount of from 5 percent by weight to 35 percent by weight of the total weight of flexible graphite and lubricant present.

21. An injectable packing formulation as in claim 19 wherein the liquid lubricant is present in an amount of from 15 percent by weight to 30 percent by weight of the total weight of flexible graphite and lubricant present.

22. In a stuffing box assembly, the improvement wherein the stuffing box is packed with a packing formulation comprising particulate flexible graphite and a liquid lubricant.

23. A stuffing box assembly as in claim 22 wherein the liquid lubricant is present in an amount of from 5 percent by weight to 35 percent by weight of the total weight of flexible graphite and lubricant present.

24. A stuffing box assembly as in claim 22 wherein the liquid lubricant is present in an amount of from 15 percent by weight to 30 percent by weight of the total weight of flexible graphite and lubricant present.

25. A stuffing box assembly as in claim 22 wherein the packing formulation is formed from flexible graphite particles of a size sufficient to be retained on a No. 50 U.S. Standard sieve but do not exceed 0.250 inch in length.

26. A stuffing box assembly as in claim 25 wherein the liquid lubricant is present in an amount of from 5 percent by weight to 35 percent by weight of the total weight of flexible graphite and lubricant present.

27. A stuffing box assembly as in claim 25 wherein the liquid lubricant is present in an amount of from 15 percent by weight to 30 percent by weight of the total weight of flexible graphite and lubricant present.

28. A stuffing box assembly as in claim 22 wherein the packing formulation is formed from flexible graphite particles of a size sufficient to be retained on a No. 30 U.S. Standard sieve but do not exceed 0.250 inch in length.

29. A stuffing box assembly as in claim 28 wherein the liquid lubricant is present in an amount of from 5 percent by weight to 35 percent by weight of the total weight of flexible graphite and lubricant present.

30. A stuffing box assembly as in claim 28 wherein the liquid lubricant is present in an amount of from 15 percent by weight to 30 percent by weight of the total weight of flexible graphite and lubricant present.

31. A stuffing box assembly as in claim 25 wherein the flexible graphite particles employed in forming the packing formulation are produced from sheet having a density of from 10 lbs./ft.$^3$ to 100 lbs./ft.$^3$ and a thickness of from 0.003 inch to 0.060 inch.

32. A stuffing box assembly as in claim 31 wherein the liquid lubricant is present in an amount of from 5 percent by weight to 35 percent by weight of the total weight of flexible graphite and lubricant present.

33. A stuffing box assembly as in claim 31 wherein the liquid lubricant is present in an amount of from 15 percent by weight to 30 percent by weight of the total weight of flexible graphite and lubricant present.

34. A stuffing box assembly as in claim 25 wherein the flexible graphite particles employed in forming the packing formulation are produced from sheet having a density of from 50 lbs./ft.$^3$ to 90 lbs./ft.$^3$ and a thickness of from 0.005 inch to 0.025 inch.

35. A stuffing box assembly as in claim 34 wherein the liquid lubricant is present in an amount of from 5 percent by weight to 35 percent by weight of the total weight of flexible graphite and lubricant present.

36. A stuffing box assembly as in claim 34 wherein the liquid lubricant is present in an amount of from 15 percent by weight to 30 percent by weight of the total weight of flexible graphite and lubricant present.

37. A stuffing box assembly as in claim 28 wherein the flexible graphite particles employed in forming the packing formulation are produced from sheet having a density of from 10 lbs./ft.$^3$ to 100 lbs./ft.$^3$ and a thickness of from 0.003 inch to 0.060 inch.

38. A stuffing box assembly as in claim 37 wherein the liquid lubricant is present in an amount of from 5 percent by weight to 35 percent by weight of the total weight of flexible graphite and lubricant present.

39. A stuffing box assembly as in claim 37 wherein the liquid lubricant is present in an amount of from 15 percent by weight to 30 percent by weight of the total weight of flexible graphite and lubricant present.

40. A stuffing box assembly as in claim 28 wherein the flexible graphite particles employed in forming the packing formulation are produced from sheet having a density of from 50 lbs./ft.$^3$ to 90 lbs./ft.$^3$ and a thickness of from 0.005 inch to 0.025 inch.

41. A stuffing box assembly as in claim 40 wherein the liquid lubricant is present in an amount of from 5 percent by weight to 35 percent by weight of the total weight of flexible graphite and lubricant present.

42. A stuffing box assembly as in claim 40 wherein the liquid lubricant is present in an amount of from 15 percent by weight to 30 percent by weight of the total weight of flexible graphite and lubricant present.

* * * * *